Nov. 22, 1966  R. E. BENDL  3,286,515
TENSILE STRENGTH TESTING DEVICE
Filed Oct. 8, 1963  2 Sheets-Sheet 1

INVENTOR.
ROBERT E. BENDL
BY Harry M. Saragovitz,
Edward J. Kelly,
Herbert Berl &
James W. Colvin Nov. 22, 1966   R. E. BENDL   3,286,515
TENSILE STRENGTH TESTING DEVICE
Filed Oct. 8, 1963   2 Sheets-Sheet 2
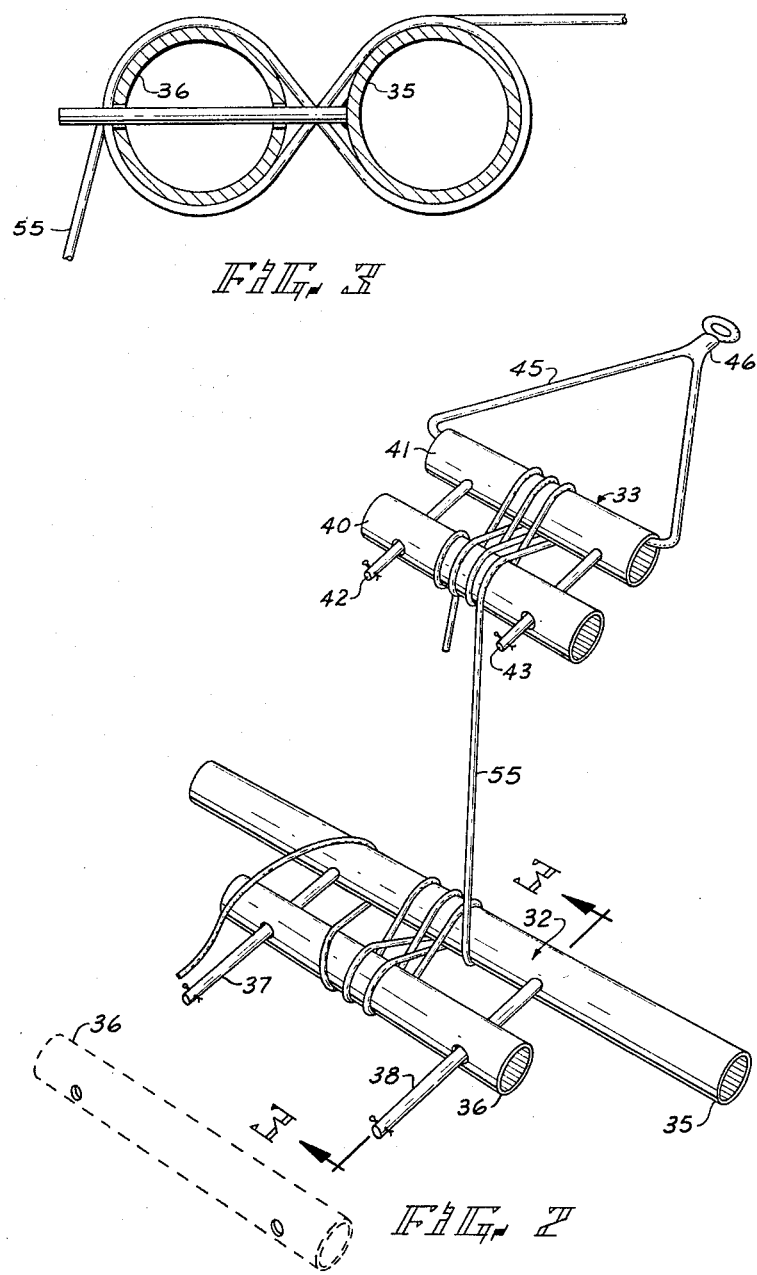
INVENTOR.
ROBERT E. BENDL

3,286,515
TENSILE STRENGTH TESTING DEVICE
Robert E. Bendl, Grafton Court, R.F.D. 2, Denbigh, Va.
Filed Oct. 8, 1963, Ser. No. 314,819
3 Claims. (Cl. 73—95.5)

The invention described herein may be manufactured and used by or for the Government for governmental purposes without the payment to me of any royalty thereon.

This invention relates to machines for testing the tensile strength of flexible strands, such as cords, ropes, cables, etc., and more particularly for testing the tensile strength of lines or ropes made of twisted fiber such as hemp, cotton, nylon, and similar materials.

A number of devices have been developed for testing the strength of cords, lines, and ropes but these devices have been subject to various defects and deficiencies in use, including the inability to obtain a true tensile strength reading because of concentration of stresses in the specimen at the points at which it is connected to the testing machine.

It is among the objects of the present invention to provide an improved tensile strength testing machine so constructed and arranged that it is easy to attach a specimen line to the machine and the specimen can be stretched in the machine to the breaking point without the concentration of force at any location along the line.

A further object resides in the provision of an improved tensile strength testing machine which is readily portable and requires no permanent base or fixture.

A still further object resides in the provision of an improved tensile strength testing machine which can be assembled to a major extent from standard items of shop equipment.

An additional object resides in the provision of a machine of the character indicated which is so arranged and constructed as not to be subjected to jerks or shocks on breaking of the specimen being tested.

Other objects and advantages will become apparent from a consideration of the following description and the appended claims in conjunction with the accompanying drawings wherein:

FIG. 2 is a perspective view of the line attaching components of the machine with the parts separated to particularly show the manner in which the test line is connected to the machine; and FIG. 3 is a cross-sectional view on an enlarged scale substantially on a plane indicated by the line 3—3 on FIG. 2.

Figure 1:
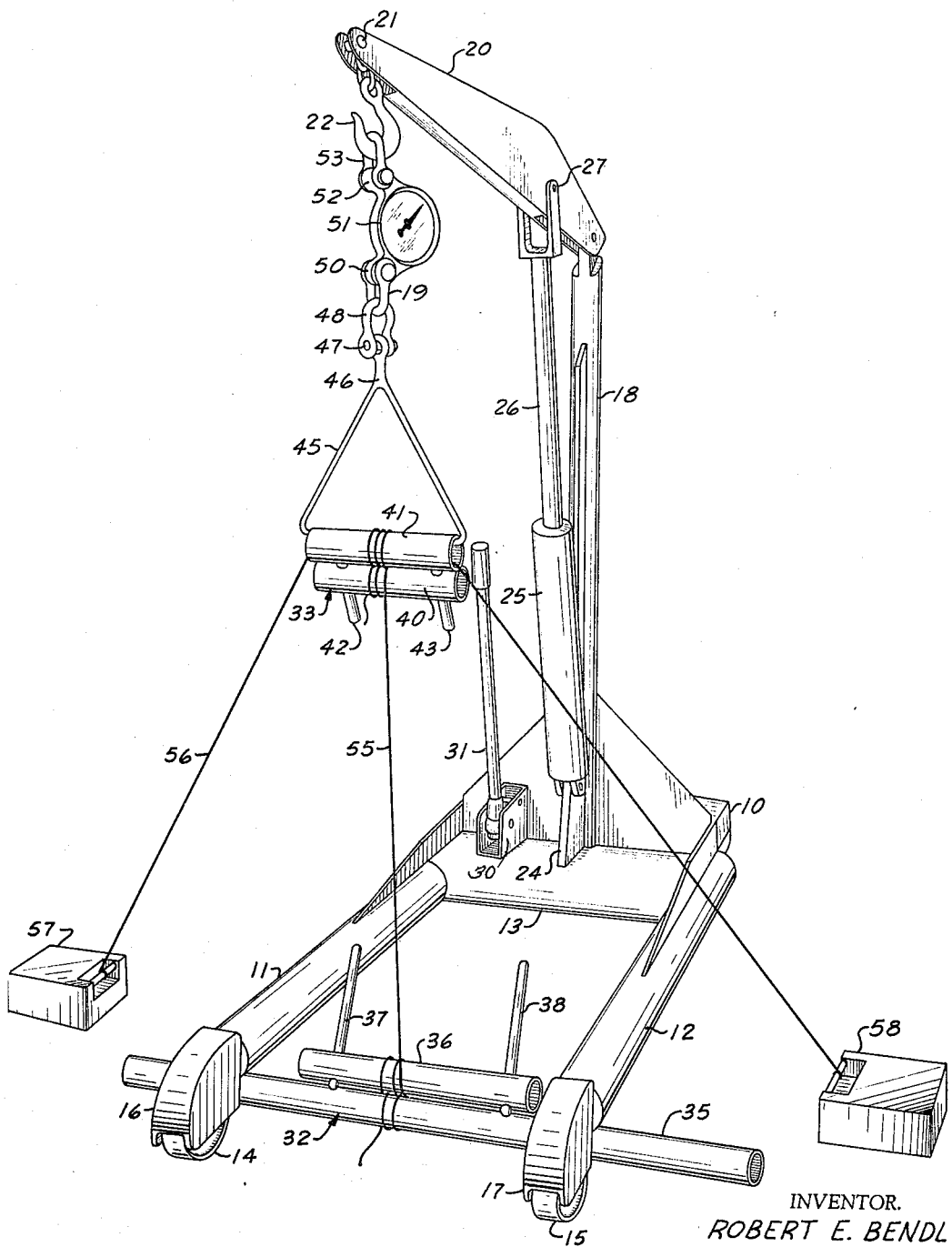
FIG. 1 is a perspective view of a tensile strength testing machine illustrative of the invention.

With continued reference to the drawings, the tensile strength testing apparatus may comprise suitable mechanism similar to a lift or hoist, generally indicated at 10 in FIG. 1. This hoist may be a conventional piece of shop equipment and has a base comprising a pair of elongated side members 11 and 12, illustrated as of tubular construction, which members are coterminus and secured together at corresponding ends by a flat platform 13 which extends perpendicularly between the side members and is rigidly secured to the side members at its opposite ends, the side members and platform constituting the base of the machine. At the end of the side members remote from the platform 13, suitable brackets are provided carrying ground engaged wheels 14 and 15. The upper portions of these wheels are covered by fenders 16 and 17 rigidly secured to the adjacent ends of the side members 11 and 12. A wheel may be secured to the platform 13 if desired but normally this end of the base is permitted to rest on the supporting surface and mobility is provided by lifting the platform end of the base and trailing the device on the wheels 14 and 15.

A mast 18 is secured at its lower end to the platform 13 at the midlength location of the platform and extends perpendicularly upward from the platform for a suitable distance, depending upon the intended use of the lift device or hoist. An arm 20 is pivotally secured at one end to the upper end of the mast 18 and projects from the upper end of the mast over the space between the two side members 11 and 12 and suitable means, such as the pin 21, are provided at the end of the arm remote from the mast for connecting to the arm suitable load engaging means, such as the hook 22. The upright position of the mast 18 relative to the base plate 13 is reinforced by a gusset 24 extending along the side of the mast nearest the wheels 14 and 15 and secured at its lower end to the base plate 13, and the lower end of the cylinder 25 of an expansible chamber hydraulic device is pivotally connected to the gusset 24 near the lower end of the gusset. This cylinder extends upwardly from its pivotal connection to gusset 24 and a piston rod 26 extends from the upper end of the cylinder and is connected at its upper end to the arm 20 by a pivotal connection 27 intermediate the length of the arm.

A manually operable hydraulic pump 30 is mounted on the platform 13 and hydraulically connected to the lower end of the cylinder 25, this pump being actuated by a hand lever 31 extending upwardly from the pump. A suitable valve, not illustrated but well known to the art, is provided in association with the pump 30 for connecting the outlet or pressure side of the pump to the cylinder for forcing the piston rod 26 outwardly of the cylinder or with the inlet side of the pump or a suitable sump to permit hydraulic fluid to vent from the cylinder thereby permitting the piston rod to move inwardly of the cylinder. When the pump and valve are operative to force fluid under pressure into the lower end of the cylinder, the free or hook carrying end of the arm 20 is raised relative to the base of the device.

In order to convert this more or less conventional lift apparatus or hoist into a tensile strength testing device, two structures 32 and 33 are provided for securing the ends of a specimen strand one end to the base and the other end to the hook of the machine.

The structure 32 comprises an elongated, cylindrical member 35 having a length greater than the distance between the wheel carrying ends of the side members 11 and 12, a second cylindrical member 36 having a length less than the space between the side members 11 and 12 and pins 37 and 38 secured at corresponding ends to the member 35 and extends slidably through diametrically opposite apertures provided in members 26 near the opposite ends of this member. The members 35 and 36 are hollow or tubular to reduce the weight. The pins 37 and 38 have their longitudinal center lines substantially in a plane which also includes the longitudinal center line of the member 35.

The structure 33 comprises a pair of tubular members 40 and 41 of cylindrical shape and of substantially the same length, both being shorter than the member 36. The member 41 carries a pair of spaced apart pins 42 and 43 which extend slidably through aligned apertures in member 40 near the opposite ends of this member, the pins 42 and 43 have their longitudinal center lines substantially in a plane which includes the longitudinal center line of the member 41. A triangular ring or gambrel 45 has one leg extending through the tubular member 41 and has at its apex opposite this leg an eye formation 46 receiving the pin 47 of a clevis 48. The clevis 48 is engaged with a clevis 49 secured to one arm 50 of a tensile force measuring instrument or spring balance 51 the other arm 52 of which is connected to the hook 22 by a clevis 53. With this arrangement, the instrument 51 will indicate in pounds the force applied between the hook carrying end of the arm 20 and the base of the hoist.

In order to connect a flexible line to the device for testing, one end portion of the line 55 is wound alternately around the members 35 and 36 with these members in a separated and substantially parallel position and connected by the pins 37 and 38, as illustrated in FIG. 2. Several wraps of the line are applied to the members 35 and 36 with the portions of the line between the two members crossed. In other words, the end portion of the line is run over member 35 and under the member 36, then over the member 36 and under the member 35 to make as many wrappings of substantially figure-8 shape as are considered necessary. The line is then pulled tight and the member 36 moved toward the member 35 until the line is firmly engaged by the two members, as shown in FIG. 3. A portion of the line at the other end thereof is similarly wrapped about the tubular members 40 and 41 and the member 40 is then moved toward the member 41 while the line is pulled tight until the corresponding end portions of the line are clamped between the members 40 and 41. The longitudinal tubular member 35 is then placed under the wheel carrying end portions of the base side members 11 and 12 and this holds the structure 32 against being pulled upwardly when tensile force is applied to the specimen line 55. The hand pump 30 is then operated to raise the hook carrying arm 20 to place the specimen line 55 under tension and this action may be continued, if desired, until the line breaks between the members 36 and 40. The tensile force applied to the line will be indicated at all times by the pointer of the indicating instrument 51 and these readings may be noted to provide test data for later use.

A line or cable 56 is run through the tubular member 40 and has its ends connected to weights or blocks 57 and 58 which rest slidably on the floor or ground at respectively opposite sides of the machine base. The blocks will be moved to loosen the line 56 during the testing operation so that the instrument 51 will give a true reading. However, if the line 55 breaks, the line 56 will hold the structure 33 against being jerked upwardly with sufficient force to damage this structure or the measuring instrument 51.

The tubular members of the structures 32 and 33 have smooth external surfaces and sufficiently large diameters that they do not cause any sharp bends in the line to be tested. The smooth surfaces of these members also permit the line to pull to some extent around the members so that the entire tensile force applied to the line is not taken by the first wrapping of the line around the tubes of either of the connecting structures but is distributed through the several wrappings. This avoids concentration of load or stress at any particular point along the line and particularly at those points at which the line is connected to the tensile strength testing apparatus. This permits the indicating instrument to give a true reading of the maximum tensile strength of the line since the line, when attached in the manner indicated, will nearly always break between the two attaching structures.

After a line has been tested and the tension on it relieved, it can be easily removed from the apparatus by feeding the end portions back through the space between the tubular members gradually moving the tubular members until the wrappings become readily accessible and can be quickly removed.

While an illustrative embodiment of the invention has been herein above described and illustrated in the accompanying drawings, it is to be understood that the scope of the invention is in no way limited to the particular embodiment so illustrated and described but is commensurate with the scope of the appended claims.

What is claimed is:

1. A portable machine for testing the tensile strength of flexible strands comprising a base, and arm disposed above said base, means supporting said arm from said base, manually controllable means acting between said base and said arm for applying graduated force to move said arm away from said base, and means including a force measuring instrument and strand connecting structures effective to connect a strand to be tested between said base and said arm, each of said strand connecting structures comprising a pair of members of cylindrical shape disposed in side by side relationship, pins secured to one member and extending therefrom in parallel and spaced apart relationship through pin receiving apertures in the other member, said members receiving a strand wrapped around both members with alternate portions of the strand between said members crossed relative to each other.

2. A portable machine for testing the tensile strength of flexible strands comprising a base, an arm disposed above said base, means supporting said arm from said base, manually controllable means acting between said base and said arm for applying graduated force to move said arm away from said base, and means including a force measuring instrument and strand connecting structures effective to connect a strand to be tested between said base and said arm, each of said strand connecting structures comprising a pair of members of cylindrical shape disposed in side by side relationship, pins secured to one member and extending therefrom in parallel and spaced apart relationship through pin receiving apertures in the other member, said members receiving a strand wrapped around both members with alternate portions of the strand between said members crossed relative to each other, one of said cylindrical members having a length sufficient to engage under said base.

3. Means for connecting a flexible strand to a tension absorbing structure in a manner to avoid concentration of stress at any particular location along said strand, said means comprising a first tubular member of cylindrical shape, a second tubular member of cylindrical shape disposed adjacent and parallel to said first member, both of said members being of a diameter sufficient to avoid any sharp bends in a flexible strand wrapped around said members, and guide pins secured to one of said members and extending slidably through apertures in the other of said members to maintain said members in substantially parallel relationship while permitting variation in the distance therebetween.

References Cited by the Examiner

UNITED STATES PATENTS

| | | | |
|---|---|---|---|
| 317,752 | 5/1885 | Faija | 73—95 |
| 610,105 | 8/1898 | Thayer | 24—136 |
| 2,293,084 | 8/1942 | Sedam | 73—103 |

RICHARD C. QUEISSER, *Primary Examiner.*

JERRY W. MYRACLE, *Assistant Examiner.*